United States Patent
Shigeeda

(10) Patent No.: US 8,422,075 B2
(45) Date of Patent: Apr. 16, 2013

(54) INFORMATION UPDATING APPARATUS, IMAGE HISTORY INSPECTION APPARATUS, INFORMATION UPDATING METHOD, AND STORAGE MEDIUM

(75) Inventor: Nobuyuki Shigeeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 12/862,181

(22) Filed: Aug. 24, 2010

(65) Prior Publication Data

US 2011/0051160 A1  Mar. 3, 2011

(30) Foreign Application Priority Data

Aug. 31, 2009 (JP) ................. 2009-200239

(51) Int. Cl.
*H04N 1/60* (2006.01)

(52) U.S. Cl.
USPC ......... 358/1.9; 358/1.13; 358/1.14; 358/1.15; 358/1.1; 709/205; 709/221

(58) Field of Classification Search ........... 358/1.1, 358/1.9, 1.13, 1.14, 1.15, 1.17, 402; 709/205, 709/221

See application file for complete search history.

(56) References Cited

U.S. PATENT DOCUMENTS

| | | | | |
|---|---|---|---|---|
| 8,299,890 | B2 * | 10/2012 | Nagasawa | 340/5.2 |
| 2005/0100353 | A1 * | 5/2005 | Kawaura | 399/8 |
| 2007/0285699 | A1 * | 12/2007 | Kamimura | 358/1.13 |
| 2008/0181650 | A1 * | 7/2008 | Matsui | 399/80 |
| 2008/0187345 | A1 * | 8/2008 | Sorihashi | 399/83 |

FOREIGN PATENT DOCUMENTS

JP  2006-229670 A  8/2006

\* cited by examiner

*Primary Examiner* — King Poon
*Assistant Examiner* — Allen H Nguyen
(74) *Attorney, Agent, or Firm* — Canon USA Inc. IP Division

(57) ABSTRACT

An information updating apparatus compares resolution information and color information acquired from received image data with resolution information and color information acquired from an external apparatus, and, if an amount of information of the resolution information and color information acquired from the received image data is larger than an amount of information of the resolution information and color information acquired from the external apparatus, replaces image feature amount data stored in the external apparatus with image feature amount data acquired from the received image data and replaces text data stored in the external apparatus with text data extracted from the received image data.

9 Claims, 7 Drawing Sheets

INFORMATION UPDATING APPARATUS, IMAGE HISTORY INSPECTION APPARATUS, INFORMATION UPDATING METHOD, AND STORAGE MEDIUM

BACKGROUND OF THE INVENTION

1. Field of the Invention

The present invention relates to an information updating apparatus for updating information about an apparatus for collecting job history and content history in a print driver and managing the job history and the content history for inspection, an image history inspection apparatus, an information updating method, and a storage medium.

2. Description of the Related Art

An image history inspection apparatus is known in which job and content histories in an image forming apparatus are collected, associated with each other, and managed in an integrated fashion, thereafter to inhibit unauthorized printing with reference to printing history. The apparatus is used to allow inspecting when, where, and how a process (copy, facsimile, print, and SEND) of which contents is performed by whom. At the time of inspection, the job and content histories are searched to search for the corresponding job history and content history from a large amount of history information.

The image history inspection apparatus has a full-text search function and an image search function. The full-text search is applied to text data extracted from image data acquired as content history and subjected to an optical character recognition (OCR) process. The image search is applied to image feature amount data extracted from image data as content history. Text data and image feature amount data are used as index information for search.

Japanese Patent Application Laid-Open No. 2006-229670 discusses an image forming apparatus in which copy history information is added to a copy source document or copied document every time processing is performed to inspect the copy history of the document. The added history information can be reproduced by scanning the document by a copying machine. Since history information is added to the copy source document or copied document and the history information is added or updated every time copying is performed, the copy history of a document can be tracked.

Addition and update of information are not performed on content history once registered. For this reason, if content history with a small information amount is registered, a search accuracy can be lowered, leading to a poor inspection efficiency.

SUMMARY OF THE INVENTION

According to an aspect of the present invention, an information updating apparatus capable of communicating with an external apparatus storing at least text data extracted from image data, image feature amount data extracted from image data, resolution information of image data, and color information of image data, includes a receiving unit configured to receive image data and acquire identification information uniquely allocated to each image data from the received image data, an acquiring unit configured to acquire image feature amount data from the received image data, an inquiring unit configured to inquire of the external apparatus whether identification information being the same as identification information acquired from the received image data is stored in the external apparatus, and, if it is found that identification information being the same as the identification information acquired from the received image data is stored in the external apparatus, to acquire, from the external apparatus, resolution information and color information corresponding to the identification information stored in the external apparatus, and a comparing unit configured to compare resolution information and color information acquired from the received image data with the resolution information and color information acquired from the external apparatus, and, if an amount of information of the resolution information and color information acquired from the received image data is larger than an amount of information of the resolution information and color information acquired from the external apparatus, to replace the image feature amount data stored in the external apparatus with the image feature amount data acquired from the received image data and replace text data stored in the external apparatus with text data extracted from the received image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
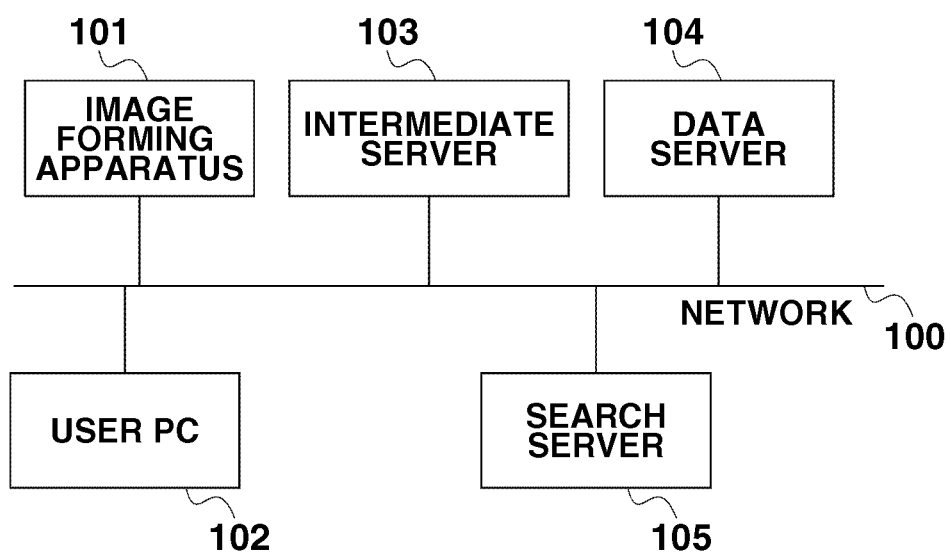
FIG. 1 is a block diagram illustrating a network configuration of an image history inspection apparatus.

FIG. 1 is a block diagram illustrating an image history inspection apparatus according to an exemplary embodiment of the present invention.

The image history inspection apparatus includes an image forming apparatus 101, a user PC 102, an intermediate server 103, a data server 104, and a search server 105, which are connected to a network 100. The network 100 uses a local area network (LAN) operated in an office or a wide area network (WAN) operated in a wide area over the Internet. The image history inspection apparatus is formed of such a network, each apparatus connected to the network, a PC, and a server. Each apparatus forming the image history inspection apparatus is communicable through the network.

In FIG. 1, a multifunction peripheral (MFP) 101 being an example of an image forming apparatus has a network function, a scan function, and a printer function, and operates as a copying machine and a printer with these functions compositely operated. The MFP 101 has an agent function. The agent function transfers a job history and a content history, acquired by a device about jobs such as copy or facsimile transmission which a user performs using the MFP 101, to the intermediate server 103.

The job history refers to attribute information of a job executed by the user. The job history includes information such as the type of the executed job, the name of a user issuing the job, date on which the job is issued, the name of an apparatus by which the job is generated, and so forth. The content history refers to image data and text data input (or output) along with the execution of a job. The content history can include image feature amount data extracted from image data. The image feature amount data refers to a value featuring an image, such as luminance information, color information, edge information, and a value obtained from the quantity thereof using a predetermined algorithm. The image feature amount is used to search images.

The user PC 102 is provided with a print driver, which functions in a printing process by an application software. The user PC 102 incorporates an add-in software (not illustrated) for expanding the function of the print driver to acquire the job history and the content history related to print data which the user PC transmits to the MFP 101. The job history and the content history acquired by the user PC 102 are transferred to the intermediate server by an agent software for PC (not illustrated). The agent software can be installed on the user PC 102 or a print server (not illustrated) provided on a network.

The job history and the content history transferred by the MFP 101 or the user PC 102 are sent to the intermediate server 103 via the network 100. The intermediate server 103 subjects the job history and the content history to a data converting process and registers the job history and the content history in the data server 104.

The data converting process includes an image resolution conversion, data compression, data format conversion, text extraction by OCR, and extraction of image feature amount for searching images. The intermediate server 103 registers the data in the data server 104 using Open Database Connectivity (ODBC) or other data providers.

The data server 104 has a large capacity storage formed of one or more HDDs and forms a database on the large capacity storage. The database is made up of one or more data tables having structure inherent in an application. The database is managed by a database management system (DBMS) operating on the data server 104 to ensure consistency of data in processes such as registration, update, and search of data. The job history and the content history are registered in the data server 104 via the DBMS.

It is possible to refer to the job history and the content history stored in the data server 104 using the search server 105. The search server 105 is constructed of a web application. The user accesses the search server 105 using a web browser. The user specifies a search query to find the job history and the content history to which the user desires to refer and the search server 105 executes a search process based on the query. A search result is displayed on the web browser which the user views via the search server 105.

Figure 2:
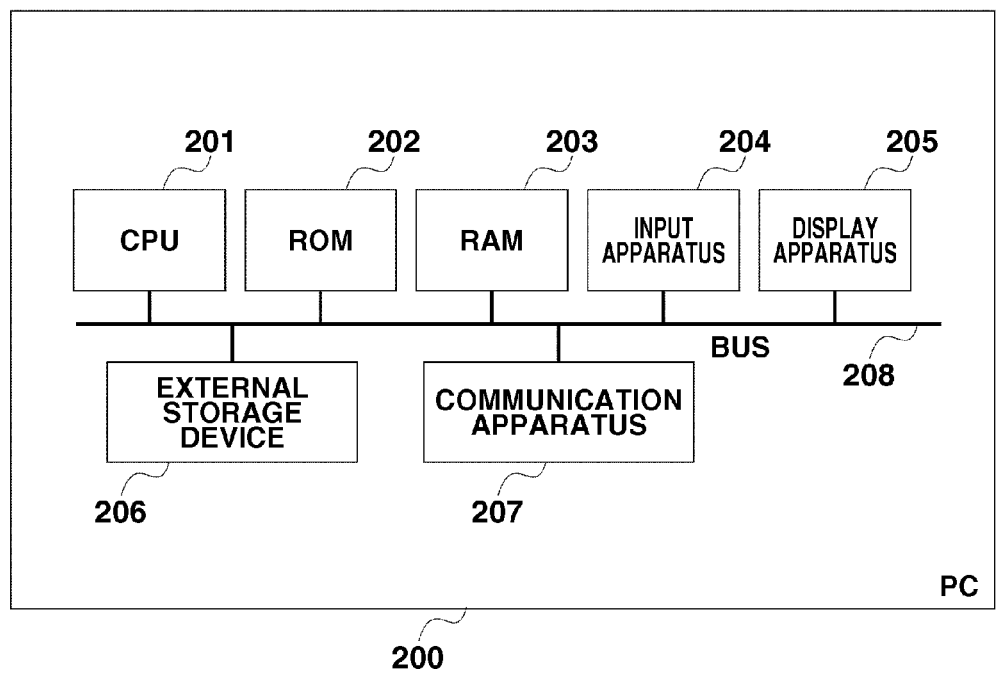
FIG. 2 is a block diagram illustrating a hardware configuration of a personal computer (PC) or a server.

FIG. 2 is a block diagram illustrating the hardware configuration of the server or the PC constituting the image history inspection apparatus according to the present exemplary embodiment. In FIG. 2, a CPU 201 performs various data processes in relation to job history acquisition and a calculation process for search and controls the components connected to a BUS 208.

A read-only memory (ROM) 202 is a memory dedicated for reading data and stores the basic control program for an information processing apparatus 200. A random access memory (RAM) 203 is a memory for reading or writing data and used for various calculation processes and temporary storage. An external storage device 206 is used as a temporary storage area for a system program of the operating system (OS) of the information processing apparatus 200 and an information update program of the image history inspection apparatus and as a temporary storage area in processing data. The external storage device 206 is slower in input and output of data than the RAM 203, but capable of storing a large amount of data. A magnetic storage device (HDD) mainly corresponds to the external storage device 206, and the external storage device 206 includes an apparatus in which external media such as a CD-ROM, a DVD-ROM, and a memory card are connected to read and record data.

An input apparatus 204 inputs characters and data to the information processing apparatus 200. Various keyboards and mice correspond to the input apparatus 204. A display apparatus 205 displays the process result from the information processing apparatus 200. A cathode-ray tube (CRT) or a liquid crystal monitor corresponds to the display apparatus 205. A communication apparatus 207 is used when connected to a LAN to perform data communication with another communication apparatus according to Transmission Control Protocol/Internet Protocol (TCP/IP).

Figure 3:
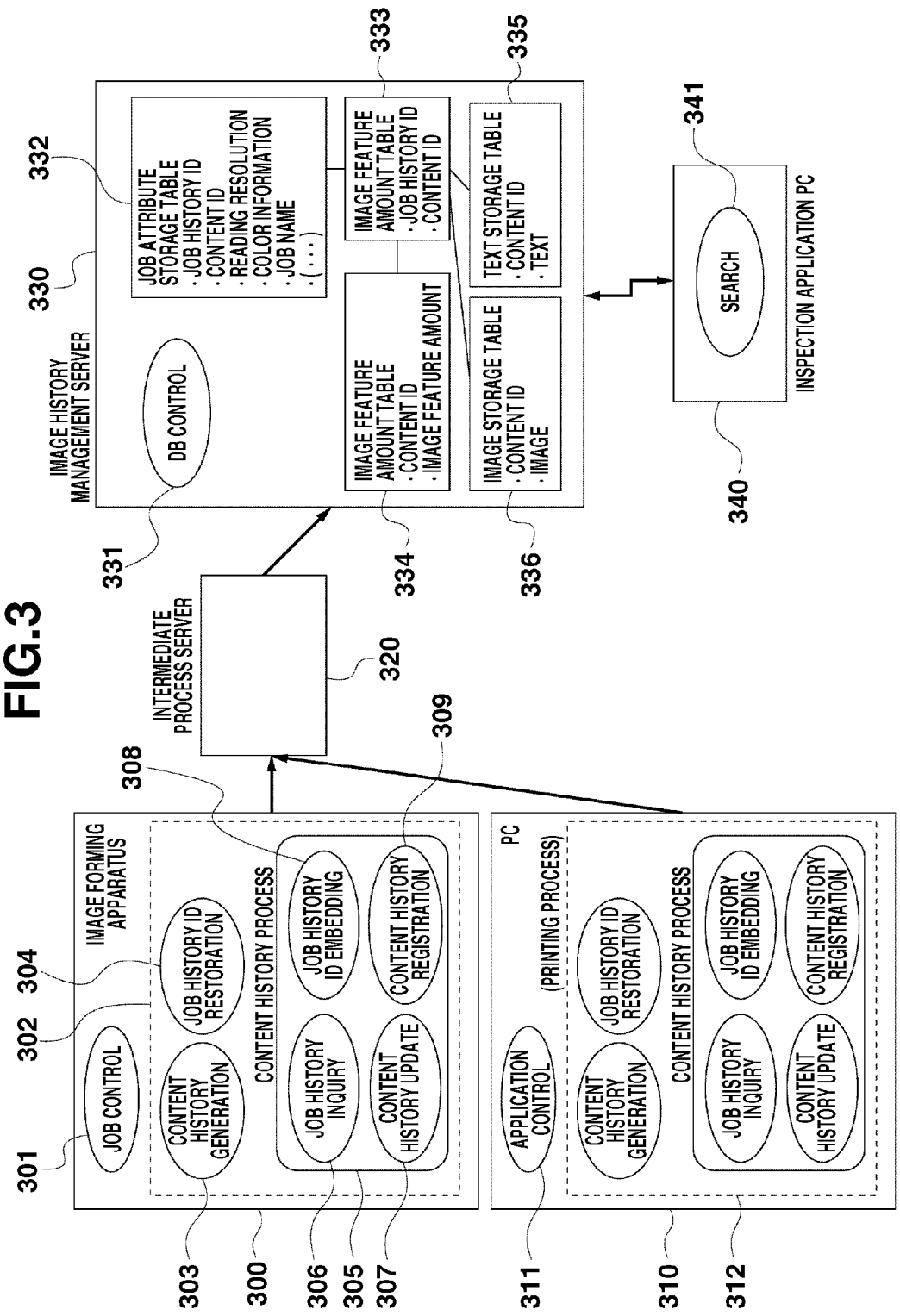
FIG. 3 is a block diagram illustrating a configuration of software modules of the image history inspection apparatus.

FIG. 3 is a block diagram illustrating a configuration of software modules of the image history inspection apparatus according to the present exemplary embodiment. An image forming apparatus 300 illustrated in FIG. 3 corresponds to the MFP 101 illustrated in FIG. 1. The image forming apparatus 300 includes a plurality of software modules according to the present exemplary embodiment. A scan or printer function executed by the image forming apparatus 300 is generated and managed as one job process every time it is executed. A job control module 301 generates and manages the jobs.

A software module group 302 operates in units of a software process for executing a job. A content history generation module 303 generates history information made up of contents themselves such as an image and/or text in a specified job. Content history can be uniquely identified by a content ID.

The job control module 301 generates a job and records a job history of the job. The content ID is recorded also in the job history to associate the job history with the content history.

The user executes scan to cause the job control module 301 to generate a scan job, read a document with a scanner, and generate the job history of the scan job. The content history generation module 303 generates a content history and records the content ID for identifying the content history in the scan job history.

When the user prints the image stored in BOX of the image forming apparatus 300, the job control module 301 generates a BOX print job and, at the same time, a BOX print job history. In this case, an image is not generated. The content ID generated when an image is previously stored in the BOX is recorded in the BOX print job history.

The job control module 301 generates an image along with the content history when the user scans an image and stores it in the BOX. While the image is being stored in the BOX, the job control module 301 stores the content history along with the image. The content ID can be recorded even in the job history of the job in which an image is not generated. The job history in which the content history is not generated like the BOX print job is referred to as a link log.

When the job control module 301 generates a job history, the job control module 301 generates identification information (ID) for uniquely identifying the job history. The identification information (ID) is referred to as a job history ID. When the user executes a job, the image forming apparatus 300 converts the job history ID into an image and combines the image of the job history ID with the output product of the job, thereby allowing the job history ID to be recorded. Such a process in which imaged specific information is combined with and embedded in the image data being an output product is referred to as addition of specific information. If the imaged specific information is the identification information of a job, only one of the imaged specific information can be embedded on an image data basis. When the image forming apparatus 300 outputs data on paper, the information is embedded in the paper using a known technique such as a watermark or a barcode (two-dimensional barcode). If the output is electronic data, the information is embedded in a part of the image of the electronic data using a technique such as an electronic watermark or a barcode (two-dimensional barcode).

A job history ID restoration module 304 is the one for restoring a previously embedded job history ID. If an input is performed with paper, a scanned image is analyzed to read the job history ID. If an input is performed with electronic data, the electronic data is loaded into a memory and subjected to an image process to read the job history ID. The job history ID thus read is used by another component described below.

If the job history ID is not embedded, a job history ID embedment module 305 newly embeds the job history ID generated by the job control module 301 along with the execution of the job in the output. If an output is performed on paper, embedment is performed using the watermark technique as described above. For the electronic data, embedment is performed in image data using the electronic watermark technique. A known watermark or barcode technique can be used for a technique in which the job history ID is embedded in the output and read from the input.

A software module group 305 performs a process related to the addition and update of the content history. A job history inquiry module 306 acquires inquiry information to a database (DB) being an external apparatus with the job history ID as a key. As described above, the job history ID is restored by the job history ID restoration module 304. The type of jobs such as COPY, facsimile, and PRINT, a document name, a name of job execution user, a date when a job is executed, a place where a job is executed, and a device name in addition to the job history ID are recorded in the job history. Furthermore, a reading resolution obtained when scanning is performed to acquire an image and color information being color or monochrome are also recorded therein. The job history inquiry module 306 acquires in particular the reading resolution and color information of an image with the restored job history ID as a key. A content history update process module 307 determines the reading resolution and color information of the image to perform the information update process of the content history. The determination of update of the content history and process content are described below.

If the job history ID does not exist, the job history inquiry module 306 cannot inquire of the DB. In this case, the job control module 301 determines that the content history has never been registered. The job control module 301 newly generates a job history ID and embeds the job history ID in the output. A job history ID embedding module 308 in FIG. 3 generates the job history ID as a unique ID and embeds the job history ID in the output.

An identification mark or number with uniqueness such as a globally unique identifier (GUID) is allocated to the job history ID. A known watermark or barcode technique can be used for a process in which the job history ID is embedded in the output.

A content history registration module 309 registers the content history generated by the content history generation module 303 in the DB. The content of the content history is previously described.

A module group 310 is equivalent to the user PC 102 illustrated in FIG. 1. Also, if a printing process is executed from document editing software to the image forming apparatus 101, for example, the content history is generated. An application control module 311 corresponds to the above document editing software, for example, and generates and controls a print job. The application control module 311 may be an application with a printing function such as an image viewer or mail software as well as the document editing software.

A software module group 312 operates in units of the printing process when the application control module 311 executes the printing process. The software module group 312 includes the modules similar to those of the software module group 302. Each module operates in the same manner that the job control module 301 executes print.

An intermediate process server 320 is similar to the intermediate server 103 illustrated in FIG. 1. The intermediate process server 320 has an image process function and an OCR function. The intermediate process server 320 may not exist in the system configuration of the present exemplary embodiment. In this case, the job history and the content history are directly registered in an image history management server 330 from the image forming apparatus 300 (or the PC 310).

The image history management server 330 is similar to the data server 104 illustrated in FIG. 1. The image history management server 330 has a database function and a storage function, and stores and manages the job history and the content history. A database control module 331 provides a database function itself.

The database includes at least a job history management table (tbl) 332, an association table (tbl) 333, an image feature amount table (tbl) 334, a text storage table (tbl) 335, and an image storage table (tbl) 336.

The job history management table 332 stores and manages job history information. The job history management table 332 includes at least the job history ID and the content ID. The job history management table 332 further includes other attribute information such as job name, job execution date, type of job, job execution user name, document name, and place. Reading resolution and color information may be included therein.

The association table 333 is the one for storing the job history ID associated with the content ID. The content ID is the one with uniqueness commonly allocated to image data generated related to a job. The content ID is generated by an input job such as scan. When the image stored in the BOX is printed again, the same content ID as that generated when stored in the BOX is associated with a different job history ID and specified. Such a job history is referred to as a link log.

The image feature amount table 334 is the one for storing and managing data characterizing an image required for searching read image. The data characterizing an image refers to color information, luminance information, and edge information of the image. The text storage table 335 is the one for storing and managing text data extracted from read image. The image storage table 336 is the one for storing read image. An image may be stored with the resolution of the image lowered to reduce the capacity of the storage.

An inspection application PC 340 is provided with a search module 341 capable of executing a search process for the image history management server 330. The search module 341 has an attribute search function for the job history management table 332, a full-text search function for text data of the text storage table 335, and an image search function. Although an image search may be performed for the image feature amount table 334, search may be performed by resolution or color information of the job history management table 332. The search module 341 is configured to compositely combine the search functions to allow a specific job history to be found.

The process flow of the image history inspection apparatus according to the present exemplary embodiment is described below.

Figure 4:
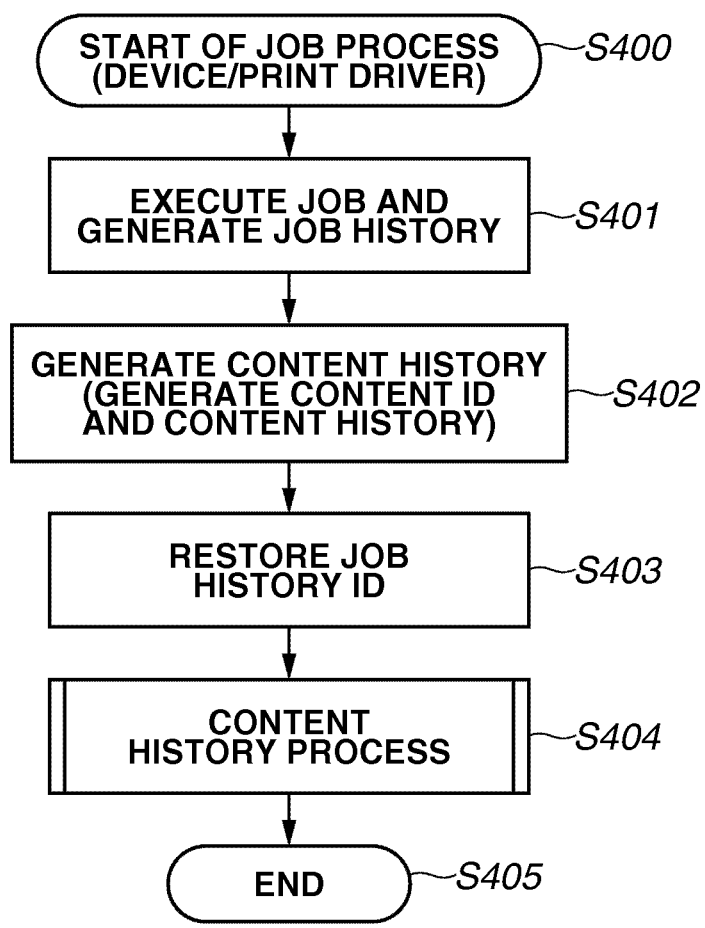
FIG. 4 is a process flow chart for executing a job in the PC and an image forming apparatus.

FIG. 4 is a process flow chart for executing a job in the PC 102 or the image forming apparatus 101. In step S400, the PC 102 executes a print job. Alternatively, in the image forming apparatus 101, the user executes a job such as copy, facsimile, scan, or SEND. In step S401, the job control module 301 generates and executes a predetermined job according to the operation of the user. At this point, job history information is also generated.

In step S402, in the process for executing the job generated by the job control module 301, the content history generation module 303 is operated to generate the content history. At this point, the content history generation module 303 also specifies the content ID.

In step S403, the job history ID restoration module 304 identifies watermark information from read image data and restores the job history ID from embedded information. The restored job history ID is the one embedded in the document specified by the user at the time of executing the job. The restored job history ID is the one associated with the job history generated by the job control module 301 when the document is printed or generated. The job history ID restoration module 304 temporarily stores the restored job history in the memory of the image forming apparatus 101.

In step S404, a content history process in FIG. 4 is the one corresponding to the content history process module group 305 in FIG. 3. A detailed process step is described in the following flow charts. In step S404, the content history process is controlled in the memory resource of the job generated and controlled by the job control module 301. In step S405, when the execution process of the job is finished and the content history process in step S404 is finished, the job control module 301 releases the corresponding memory resource and ends the process of the job.

Figure 5:
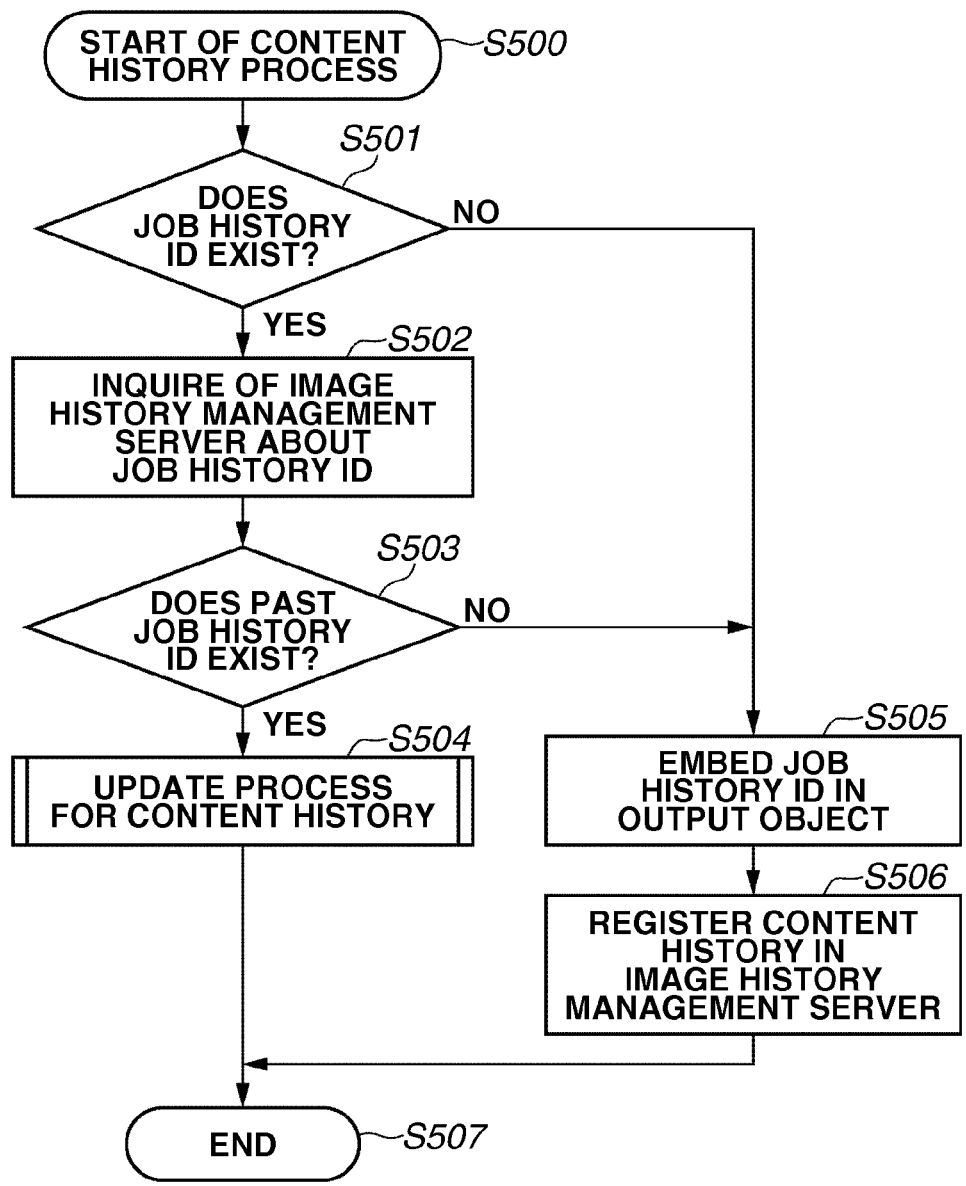
FIG. 5 is a flow chart illustrating process steps related to a content history.

FIG. 5 is a flow chart illustrating a process flow related to a content history. The process flow is a detailed process flow corresponding to the content history process in step S404 illustrated in FIG. 4. In step S500, when the job history ID restoration process in step S403 is finished, the content history process in step S404 starts.

In step S501, the job history inquiry module 306 refers to the job history ID temporarily stored in the memory of the image forming apparatus 101 to determine whether the job history ID exists. If the job history ID exists (YES in step S501), then in step S502, the job history inquiry module 306 inquires of the data server 104 with the job history ID as a query. In step S503, the job history inquiry module 306 determines whether job history information corresponding to the specified job history ID, that is, the past job history, exists. If the job history exists (YES in step S503), the processing proceeds to the update process of the content history in step S504. The update process of the content history in step S504 is described in detail below.

If the job history ID does not exist (NO in step S501) at a determination as to whether the job history ID exists, the processing proceeds to the job history ID embedment process in step S505. Similarly, if the job history does not exist (NO in step S503) at a determination as to whether the past job history exists, the processing also proceeds to the job history ID embedment process in step S505.

The job history ID embedment process in step S505 is controlled by the job history ID embedding module 308. The issued job history ID is embedded in the output product of the job of which execution the user presently specifies. The output product can be a printed paper document or electronic data. The job history ID is embedded and then, in step S506, the content history registration module 309 registers the content history generated by the content history generation module 303 in the image history management server 330.

When the update process of the content history in step S504 or the registration process of the content history in step S506 are finished, then in step S507, a series of content history processes ends.

Figure 6:
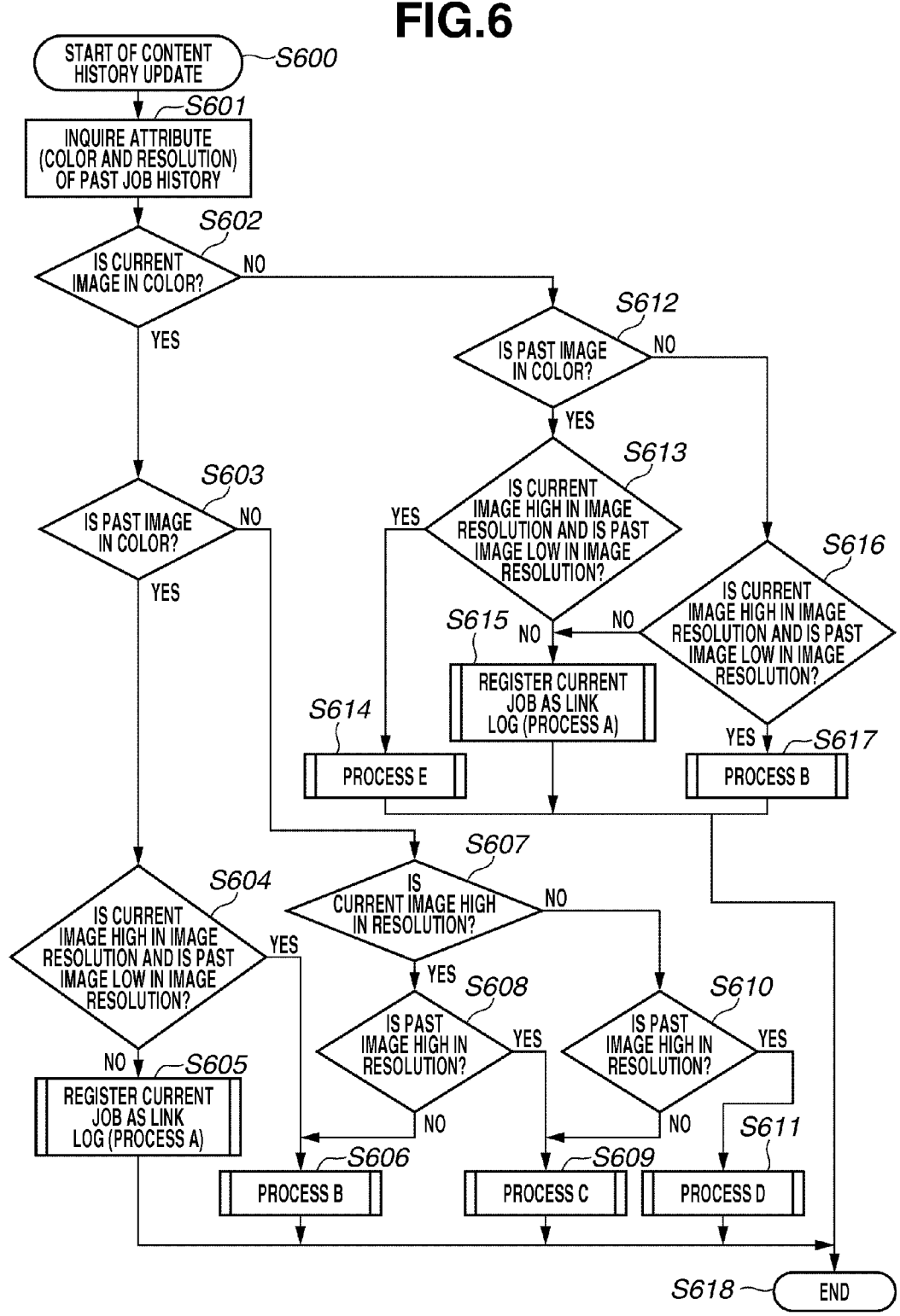
FIG. 6 is a flow chart illustrating a determination process in updating a content history.

FIG. 6 is a flow chart illustrating a detailed flow of the update process of the content history. In step S503, the job control module 301 controls the job history inquiry module 306 to inquire thereof whether the job history exists. If the job history exists, the job control module 301 invokes the content history update module 307. In step S600, the content history update module 307 starts the update process of the content history.

In step S601, the job history inquiry module 306 reads the resolution and the color information of the read image from the job history corresponding to the job history ID. The read information is temporarily stored in the memory of the image forming apparatus 101. The resolution and the color information are the ones related to an image in producing the content history in the past.

The job control module 301 acquires the image resolution and the color information of input data related to the job currently issued by the user and temporarily stores the image resolution and the color information in the memory of the image forming apparatus 101. In step S602, the content history update module 307 refers to the color information of the current input data to determine whether the current image is in color or monochrome. If the current image is in color (YES in step S602), then in step S603, the content history update module 307 further determines whether the past image is in color or monochrome. If the past image is in color (YES in step S603), then in step S604, the content history update module 307 further determines whether the current image is high in image resolution and the past image is low in image resolution. Thus, the job control module 301 compares the resolution and the color information of the current image with those of the past image to perform a determination process.

If the current image is high in image resolution and the past image is low in image resolution (YES in step S604), then in step S606, the processing proceeds to a process B. Otherwise (NO in step S604), then in step S605, the job history related to the current job is taken as a link log and registered in the image history management server 330 and, in step S618, the processing ends. For sake of convenience, step S605 is referred to as a process A.

The process A in step S605 is the one in the case where the resolution and the color information of the read image of the current job are equal to or inferior to the resolution and the color information related to the past job. In an OCR process, high resolution of the read image increases a character extraction rate to improve efficiency in full-text search. The image search uses the resolution and the color information of the read image as the feature amount of the image. An image being high in resolution and in color instead of in monochrome is larger in the amount of information characterizing the image and increases efficiency in the image search. The process A is the one in the case where the amount of information related to the image acquired when the past content history is acquired is larger than that of the current image. For this reason, the past content history does not need to be updated. Furthermore, in the process A, since the job history is taken as a link log, the current content history does not need to be acquired.

The process B in step S606 is the one in the case where the resolution of the read image of the current job is higher than that of the image acquired when the past content history is acquired. In this case, the OCR result and image feature amount acquired from the current image are larger than those from the past image in the amount of information. For this reason, the past content history is updated with the OCR extraction result and the image feature amount acquired along with the current job process. As a result, the OCR extraction result and the image feature amount included in the past content history increase in the amount of information to improve a search efficiency. The past read image itself may be updated with the current image. As a result, the read image included in the past content history becomes high in resolution.

Figure 7:
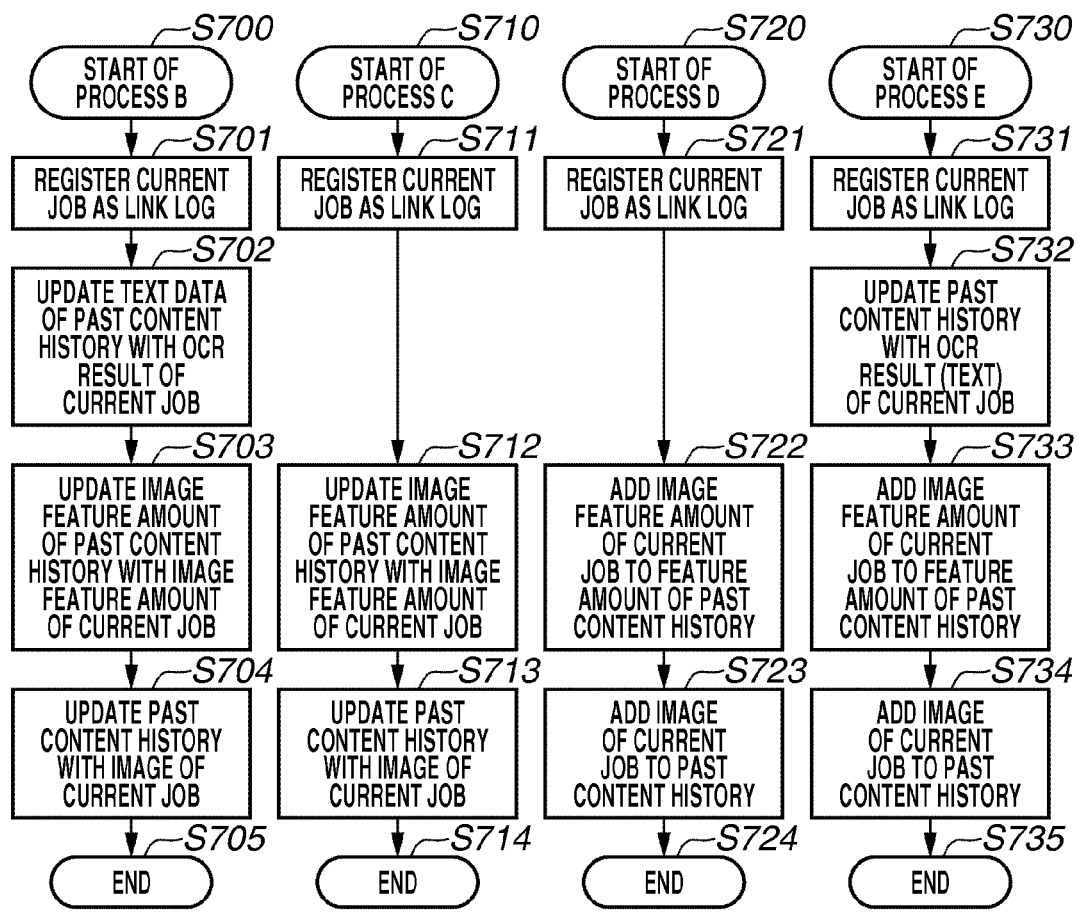
FIG. 7 is a flowchart illustrating a content-history addition update process.

FIG. 7 is a flow chart illustrating a detailed flow of the addition and update process of the content history. In step S700, the content history update process module 307 starts the process B. In step S701, the content history update process module 307 registers the current job history as a link log in the image history management server 330. In step S702, the content history update process module 307 updates text data included in the past content history with the OCR result of the current job, that is, the text data. In step S703, the content history update process module 307 updates the image feature amount included in the past content history with the image feature amount of the current job.

In step S704, the content history update process module 307 can update an image included in the past content history with the read image of the current job. The update of the read image affects the capacity of a storage constituting the image history management server 330. Therefore, the read image can be intentionally not updated to keep intact an image low in resolution. In step S705, the content history update module 307 ends the process B through the above process.

A determination process in step S607 illustrated in FIG. 6 is the one in the case where the current read image is in color and the image included in the past content history is not in color and it is determined whether the current read image is high in resolution. The determination process is performed by the content history update module 307.

If the current image is high in resolution (YES in step S607), then in step S608, the content history update module 307 determines whether the past image is high in resolution. If the past image is high in resolution (YES in step S608), the processing proceeds to a process C in step S609. If the past image is not high in resolution (NO in step S608), the processing proceeds to the process B in step S606.

In step S710, the content history update process module 307 starts the process C. In step S711, the content history update process module 307 registers the current job history as a link log in the image history management server 330. In step S712, the content history update module 307 updates the image feature amount included in the past content history with the image feature amount of the current job. The process C is the one in the case where the read images of the current job and the past job are equal to each other and high in resolution, the read image of the current job is in color and the image feature amount is large. In this case, in step S712, the content history update module 307 updates the image feature amount used for searching images. The resolution of the read images are equal to each other and high, which means that the resolution of both the read images is higher than a predetermined reference value.

In step S713, the content history update module 307 can update the image included in the past content history with the read image of the current job. In step S714, the content history update module 307 ends the process C through the above process.

A case where the current image is not high in resolution (NO in step S607) is described below. In this case, in step S610, the content history update module 307 determines whether the past image is high in resolution. If the past image is high in resolution (YES in step S610), the processing proceeds to a process D in step S611. If the past image is not high in resolution (NO in step S610), the processing proceeds to the process C in step S609.

The process D is the one in the case where the current read image is in color, the image feature amount is large, the past image is high in resolution, and the character recognition rate can be expected to be high. In this case, text data included in the past content history does not need to be updated. However, the image feature amount extracted from the current read image is effective for the color information. Therefore, in step S722, the content history update module 307 adds the image feature amount extracted from the current image to the image feature amount included in the past content history. The reason why the image feature amount extracted from the current image is added thereto is that a component related to resolution is effective for the image feature amount extracted from the past image. This allows increasing the amount of information of both a resolution component and a color component for the image feature amount.

In the process flow of the process D in FIG. 7, in step S720, the process is performed by the content history update module 307. In step S721 where the current job is registered as a link log, the content history update module 307 registers the generated job history as a link log in the image history management server 330. In step S723, the content history update module 307 adds the image of the current job to the past content history. The reason why the image included in the past content history is added without being updated is that the image acquired by the current job process is more in color information. As described above, the image data of the content history affects the capacity of a storage, but is not directly related to a search process. The user may select at user's discretion the contents of the process as to whether the past image is updated or added, or nothing is done.

If the current read image is not in color (NO in step S602), the content history update module 307 proceeds to the determination process S612. In step S612, the content history update module 307 determines whether the past read image is in color. If the past read image is in color (YES in step S612), then, the content history update module 307 executes a determination process in step S613. If the past read image is not in color (NO in step S612), then, the content history update module 307 executes a determination process in step S616. In step S613, the content history update module 307 determines whether the current image is high in resolution and the image of the past content history is low in resolution.

If the current image is monochrome, the past image is in color, and the current image is higher in resolution than the past image, the processing proceeds to a process E in step S614.

In the process E, the current read image is higher in resolution, so that text data extracted from the current image is effective for the OCR result. Therefore, in step S732, the content history update module 307 updates the text data included in the past content history with the current text data. The image feature amount extracted from the current image is effective for resolution component of image feature amount. For this reason, in step S733, the content history update module 307 adds the image feature amount extracted from the current image to the image feature amount included in the past content history.

Step S731 where the current job is registered as a link log and step S734 where the image of the current job is added to the past content history are similar to the ones in the process D.

If the current image is monochrome, the past image is in color, and the current image is higher in resolution than the past image or both of the current and the past image are low in resolution, the processing proceeds to the process A in step S615. In this case, the image feature amount and the text data included in the past content history are more effective than information acquired from the current image. Therefore, the process of updating the past content history is not performed.

If both of the current and the past image are monochrome, the content history update module 307 executes a determination process in step S616. In step S616, the content history update module 307 determines whether the current image is high in resolution and the image of the past content history is low in resolution. Since both of the current and the past image are monochrome, the process is switched depending on whether the resolution is high or low, in this case.

If the current resolution is high and the past resolution is low (YES in step S616), the processing proceeds to the process B in step S617. Otherwise (NO in step S616), the processing proceeds to the process A in step S615. The color information of both the current image and the past image does not need to be updated. With respect to the resolution of the read image, only if the current image is higher in resolution than the past image, the image feature amount and the text data included in the content history are updated.

The content history update module 307 selectively executes a series of steps of the processes A, B, C, D, and E and, then in step S618, the processing ends. When the content history update module 307 finishes the process in steps S404 and S504, the job control module 301 finishes the job control.

The present invention can also be realized by executing the following process, in which a software (a program) realizing the function of the abovementioned exemplary embodiment is supplied to a system or an apparatus via a network or various storage media, and a computer (or a CPU or an MPU) of the system or the apparatus reads and executes the program.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-200239 filed Aug. 31, 2009, which is hereby incorporated by reference herein in its entirety.

What is claimed is:

1. An information updating apparatus capable of communicating with an external apparatus storing at least text data extracted from image data, image feature amount data extracted from image data, resolution information of image data, and color information of image data, the information updating apparatus comprising:
    a receiving unit configured to receive image data and acquire identification information uniquely allocated to each image data from the received image data;
    an acquiring unit configured to acquire image feature amount data from the received image data;
    an inquiring unit configured to inquire of the external apparatus whether identification information being the same as identification information acquired from the received image data is stored in the external apparatus, and, if it is found that identification information being the same as the identification information acquired from the received image data is stored in the external apparatus, to acquire, from the external apparatus, resolution information and color information corresponding to the identification information stored in the external apparatus; and
    a comparing unit configured to compare resolution information and color information acquired from the received image data with the resolution information and color information acquired from the external apparatus and, if an amount of information of the resolution information and color information acquired from the received image data is larger than an amount of information of the resolution information and color information acquired from the external apparatus, to replace the image feature amount data stored in the external apparatus with the image feature amount data acquired from the received image data and replace text data stored in the external apparatus with text data extracted from the received image data.

2. The information updating apparatus according to claim 1, the information updating apparatus being capable of communicating with an external apparatus storing image data, text data extracted from image data, image feature amount data extracted from image data, resolution information of image data, and color information of image data,
    wherein the information updating apparatus further comprises a unit configured to compare the resolution information and color information acquired from the received image data with the resolution information and the color information acquired from the external apparatus, and, if an amount of information of the resolution information and color information acquired from the received image data is larger than an amount of information of the resolution information and color information acquired from the external apparatus, to replace image data stored in the external apparatus with the received image data.

3. The information updating apparatus according to claim 2, further comprising a storage unit configured to, if an amount of information of any one of the resolution information or color information acquired from the received image data is larger than an amount of information of the resolution information or color information acquired from the external apparatus, cause the external apparatus to additionally store the image feature amount data acquired from the received image data.

4. The information updating apparatus according to claim 3, further comprising a unit configured to, if an amount of information of the resolution information acquired from the received image data is smaller than an amount of information of the resolution information acquired from the external apparatus and an amount of information of the color information acquired from the received image data is larger than an amount of information of the color information acquired from the external apparatus, without replacing text data stored in the external apparatus, cause the external apparatus to additionally store the received image data and the image feature amount data acquired from the received image data.

5. The information updating apparatus according to claim 4, further comprising a replacement unit configured to, if the amount of information of the resolution information acquired from the received image data is larger than the amount of information of the resolution information acquired from the external apparatus and the amount of information of the color information acquired from the received image data is smaller than the amount of information of the color information acquired from the external apparatus, replace the text data stored in the external apparatus with text data extracted from the received image data and cause the external apparatus to additionally store the received image data and the image feature amount data acquired from the received image data.

6. The information updating apparatus according to claim 5, further comprising:
an imaging unit configured to image the identification information and embed the imaged identification information in image data; and
a restoring unit configured to restore the embedded identification information from the image data to acquire the identification information from the image data.

7. An image history inspection system comprising;
an external apparatus configured to store at least text data extracted from image data, image feature amount data extracted from image data, resolution information of image data, and color information of image data:
a receiving unit configured to receive image data and acquire identification information uniquely allocated to each image data from the received image data;
an acquiring unit configured to acquire image feature amount data from the received image data;
an inquiring unit configured to inquire of the external apparatus whether identification information being the same as identification information acquired from the received image data is stored in the external apparatus, and, if it is found that identification information being the same as the identification information acquired from the received image data is stored in the external apparatus, to acquire, from the external apparatus, resolution information and color information corresponding to the identification information stored in the external apparatus; and
a comparing unit configured to compare resolution information and color information acquired from the received image data with the resolution information and color information acquired from the external apparatus, and, if an amount of information of the resolution information and color information acquired from the received image data is larger than an amount of information of the resolution information and color information acquired from the external apparatus, to replace the image feature amount data stored in the external apparatus with the image feature amount data acquired from the received image data and replace text data stored in the external apparatus with text data extracted from the received image data.

8. An information updating method for an information updating apparatus capable of communicating with an external apparatus storing at least text data extracted from image data, image feature amount data extracted from image data, resolution information of image data, and color information of image data, the information updating method comprising:
receiving image data and acquiring identification information uniquely allocated to each image data from the received image data;
acquiring image feature amount data from the received image data;
inquiring of the external apparatus whether identification information being the same as identification information acquired from the received image data is stored in the external apparatus, and, if it is found that identification information being the same as the identification information acquired from the received image data is stored in the external apparatus, acquiring, from the external apparatus, resolution information and color information corresponding to the identification information stored in the external apparatus; and
comparing resolution information and color information acquired from the received image data with the resolution information and color information acquired from the external apparatus, and, if an amount of information of the resolution information and color information acquired from the received image data is larger than an amount of information of the resolution information and color information acquired from the external apparatus, replacing the image feature amount data stored in the external apparatus with the image feature amount data acquired from the received image data and replacing text data stored in the external apparatus with text data extracted from the received image data.

9. A non-transitory computer-readable storage media storing a program for causing a computer to execute the information updating method according to claim 8.

* * * * *